Figure 1:
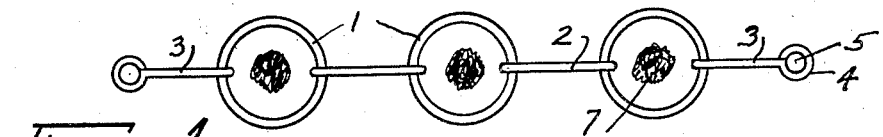

Feb. 22, 1944. L. F. SIMS 2,342,376
CELERY BLANCHING RING
Filed Jan. 19, 1942

Inventor
LAWRENCE F. SIMS.
By Howard J. Whelan.
Attorney

Patented Feb. 22, 1944

2,342,376

UNITED STATES PATENT OFFICE 2,342,376

CELERY BLANCHING RING

Lawrence F. Sims, Towson, Md.

Application January 19, 1942, Serial No. 427,343

1 Claim. (Cl. 47—3)

This invention relates to vegetable cultivation and more particularly to celery blanching methods and chains for accomplishing the desired results. It has among its objects to provide a series of rings chained together of the type referred to, that will be effective and easy to use for aligning the row from end to end and establish the center distances between the celery plants, in the row or rows. Another object is to have the rings of the device of such diameter that they will hold the stems in close engagement with each other so earth may be placed against them without contacting the heart of the celery. Another object is to eliminate the use of boards, wire spanners, stakes and the costly manner of handling same, for blanching celery. A further object is to eliminate the use of strips of special paper and spanners used in supporting same for blanching celery. Still another object is to eliminate the necessity for manually grasping and compressing the celery stems, one hand being used for the celery bunching while packing the earth around same with the other hand. A further object is to provide a device that will allow the earth to be placed around the stems by machine instead of by hand. Still another object is to provide a device that will remain in contact with the plant from its planting until its harvesting. Another object is to provide a device that will hold the celery stems together during the harvesting and eliminate mutilation of the unit. A further object is to provide a method of blanching celery that will produce a more tender stem. Still another object is to provide a device that can be placed in a predetermined position on the stems and hold same together so that the device can be lifted from the ground a distance equal to the amount of height acquired by the growth of the plant since the first placement of the ring on said stems. A further object is to provide a device which will mechanically hold the various stems together and allow the banking of loosely placed earth to produce a tenderer stem of celery than is possible when earth is packed tight enough to hold the stems together, without other holding means. In the planting and blanching of celery the process employed requires normally an alignment of the rows. This is done by marking same in a manner similar to that used for other transplanted crops. In some cases lines of small rope are used. They are tightened and a hand roller is run over them, pressing them into the soft earth, making a mark that can be followed by the planters.

Originally most of the celery grown for the markets in the United States was blanched by being banked with soil. This method required the planting in rows 3½ to 4½ feet apart, in order to provide sufficient soil with which to bank the plants. Later the growers turned very largely to close planting and the use of boards for blanching. With the gradual increase in the cost of lumber strips of especially prepared paper have largely replaced the boards. The use of boards aside from being very costly, required the use of trucks and considerable labor to handle them. After the boards were distributed they were placed alongside the rows and held in place by spanners which extended across the top of one board to another. In a few instances the boards were held in place by stakes. When paper is used it is held in place by spanners that straddle the rows and set in the ground a sufficient depth to hold the paper. About 4 men are required to apply the paper when used. In many instances it deteriorates from the weather and handling and can be used only once. This makes the method costly to use.

A process of blanching celery with ethylene gas has recently been developed. Experiments have shown that while the use of this gas will destroy the coloring matter in the celery and give a white appearance, this method of blanching does not yield the quality found in a good grade of celery that is blanched either by means of paper, boards, or especially by banking.

It was found that the use of paper and boards allowed the grower to shorten the distance between the rows as well as reduce the amount of labor and time required to blanch a crop. This saving was overcome by the loss of tenderness and other qualities which prevailed in celery which had been blanched through the old method of banking the earth up around the stems by hand while the worker held the stems closely together to prevent earth from entering between the stems and contacting the heart of the celery.

The heart portion of the celery plant lengthens during the blanching process, and any clods or rough particles of soil getting into it interferes with its development.

In harvesting celery under the usual method three men usually precede the cutter or digger and remove the boards or blanching paper. The cutter or digger is then run underneath the rows of plants to loosen them. This is expensive and troublesome.

In this invention the device consists of a chain, comprising rings and links stretched out and anchored at each end of the row where a celery plant is inserted in the ground in about the center of the ring. When the stems have reached about one-half of their maximum growth, the ring is moved up on the stems close to the outer leaves and earth is piled up against them through the use of a plow or other mechanical device. The ring holds the celery plant together and prevents earth and other foreign matter from getting to the heart of the celery. As the plant grows in height, the ring rises with it, the ring stays with the plant from the time it is planted until it is harvested. This positioning of the rings around the stalks of the celery plants is termed "buttressing," as it tends to rigidly bunch the stalks together and form a heart, while forming a more solid plant, than with a plant having the stalks spread openly out, in their natural state. This buttressing keeps the inside portions of the stalks relatively tender and crisp. The linking of the rings together makes them coordinate with one another and raise each other as the plants grow, so they all are at the same proximate level at all times, and none fall to the ground and avoid blanching and bunching individual plants. When the plants have completed their growth and are removed from the soil, they all have a uniform appearance and form, and a better commercial product. In harvesting celery grown by the method described in this invention the cutter or digger is run underneath the rows of plants to loosen them. The cost of time and services of the 4 men required to place the paper or haul and place the boards in position is eliminated. In addition the production of a grade of celery which is cleaner and superior in taste and tenderness is attained to that grown by the old slow hand method of holding and banking the dirt against the stems. In blanching celery by the use of boards or paper, the stems are not protected like they are when earth was packed around the stems. The stems are therefore very tough and unpalatable. In this invention the distance between rows is considerably shortened making it possible to place more plants per acre, and cut down the area of working. The arrangement also allows the plants to be pulled off the ground, quickly, similar to the method used in drawing in fish nets.

Figure 2:
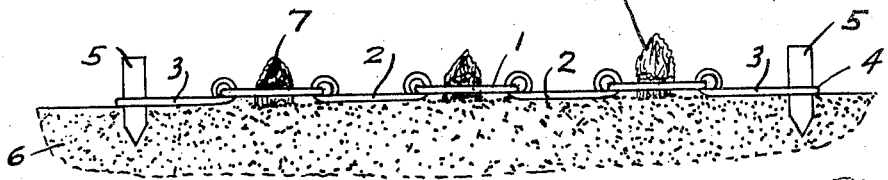
Figures 3, 4:
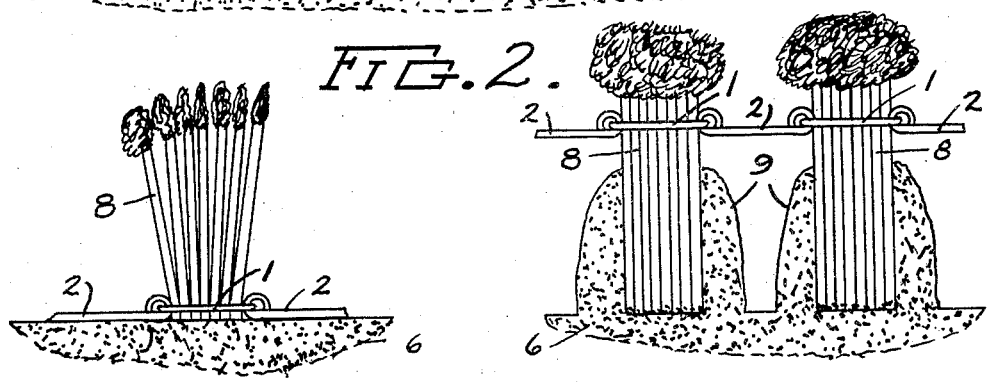
Figure 5:
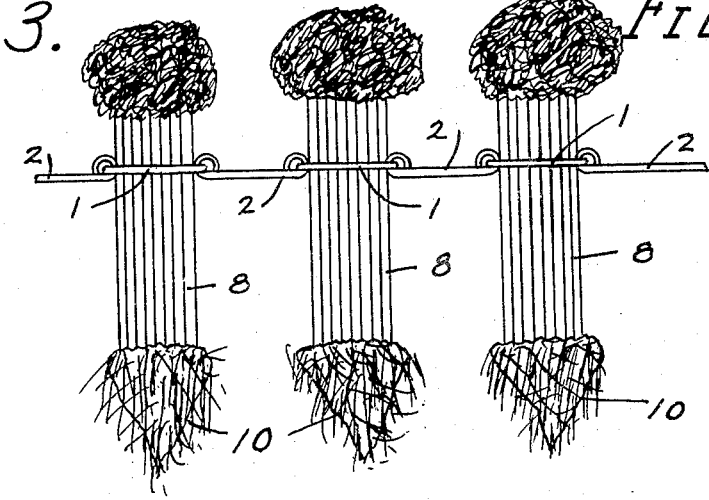

In the drawing which illustrates an embodiment of this invention:

Figure 1 is a plan view of the celery blanching chain and rings embodying this invention, Figure 2 is a side elevation of the device shown in Figure 1, Figure 3 is a side elevation showing the position of the celery chain and rings on a semi-grown celery plant, before raising the rings to compress the stems, Figure 4 is a side elevation showing the celery plant in compressed position with the earth banked up against the stems to blanch same, and, Figure 5 is a view of the plants lying on the ground after harvesting, with the rings retaining the plants for collection.

Similar reference characters refer to similar parts throughout the drawing.

In the drawing, the device and method is indicated, and consists of spacing and blanching rings 1 chained in spaced relationship with each other by links 2. The end links 3 of the string are provided with loops 4 for placement over stakes 5 driven into the ground 6 to hold the chains straight and taut. The celery plant 7 is set in the center of the rings at planting time. When the plant reaches about one-half or three-quarters growth the stems 8 are branching out in all directions as shown in Figure 3. The rings 1 are then pushed up on the stems 8 and earth 9 is banked up against the stems as shown in Figure 4. The plants are equipped with stalks 10. The use of the chain and its method of use are simple. If the hand planting method is used, the chains are stretched out and anchored at each end, the planter places a celery plant in the center of each ring by hand with a trowel or round-pointed dibble. The men doing the planting usually work astride the rows and on their knees. The cultivation and protection of the plants follow the standard and known methods used by celery growers at the present time. When the celery plants reach about one-half to three-quarters growth it is time to start blanching the stems. This is accomplished by raising the rings to positions that will hold the stems closer in relationship and prevent the earth as it is being piled up against the stems by mechanical means from getting to the heart of the celery and ruining same. When the celery is ready for harvesting, standard methods are used for cutting or digging same, and throwing the celery up on the ground; the additional difference being that the celery plants will be held together by the chains and rings as shown in Figure 5, and can be readily collected without having them scattered all over the field. The blanching rings can be used many times. If the planting is done by machinery the rings are laid over the plants after planting, instead of, before planting, as used in the hand method. All other operations are the same as described above.

While but one general form of the invention is shown in the drawing, it is not desired to limit this application to this particular form or in any other way otherwise than limited by this description, as it is appreciated that other forms could be made that would use the same principles and come within the scope of the appended claim.

Having thus described the invention, what is claimed is:

A celery plant device for buttressing the stalks progressively during the growing period thereof for blanching and bunching the latter, comprising in combination, a plurality of endless circular wire rings large enough inside to individually loosely surround the growth of seedling celery plants spaced predeterminedly apart and rest on the ground about same, said rings being of such transverse dimension inside as to fit around the respective grown plants just below the leaf line thereof with the stalks bunched together and adapted during the period of growing from young growth to maturity to hold themselves on the stalks through the resilient pressure afforded by the latter tending to spread out laterally and permit natural adjustment and positioning thereon to suit the period of growth, and a plurality of individual rigid wire links having single turn loops formed at their end portions on the upper side thereof and loosely encompassing their wire of each ring so as space same individually and predeterminedly apart in a line when the rings and links are brought to a uniform horizontal level and coordinately support each other in position and keep the plants perpendicular, said rings and links being positioned on the maturing stalks to form a gage for the height of earth to be piled up around for blanching the same, substantially as described.

LAWRENCE F. SIMS.